US009069776B1

(12) United States Patent
Taropa (10) Patent No.: US 9,069,776 B1
(45) Date of Patent: Jun. 30, 2015

(54) SERVING ENCRYPTED AND PLAIN DATA FROM A LOW LATENCY NON-VOLATILE MEMORY (71) Applicant: Google Inc., Mountain View, CA (US)

(72) Inventor: Emanuel Taropa, San Jose, CA (US)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 13/843,871

(22) Filed: Mar. 15, 2013

(51) Int. Cl.
*G06F 7/00* (2006.01)
*G06F 17/00* (2006.01)
*G06F 17/30* (2006.01)

(52) U.S. Cl.
CPC .................................. *G06F 17/3007* (2013.01)

(58) Field of Classification Search
USPC .......................................................... 707/741
See application file for complete search history.

*Primary Examiner* — Tony Mahmoudi
*Assistant Examiner* — Muluemebet Gurmu
(74) *Attorney, Agent, or Firm* — Fish & Richardson P.C.

(57) ABSTRACT

Methods, systems, and apparatus, including computer programs encoded on computer storage media, for serving encrypted and plain data from a low latency non-volatile memory. One of the methods includes executing a process on a server having a low latency volatile random access memory and a low latency non-volatile memory. The process is associated with an index file stored in the low latency volatile random access memory and encrypted and plain data stored in the low latency non-volatile memory. The process receives a query, finds data necessary to generate a response to the query using the index file, and retrieves the data from the low latency non-volatile memory whether the data is in an encrypted or a plain format. The process provides responses to queries where the responses are generated from a portion of either the encrypted data or the plain data stored in the low latency non-volatile memory.

24 Claims, 3 Drawing Sheets

SERVING ENCRYPTED AND PLAIN DATA FROM A LOW LATENCY NON-VOLATILE MEMORY

BACKGROUND

This specification relates to storing data on a server for use in response to a query.

Information retrieval systems (e.g., search engines) match queries against an index of documents generated from a document corpus (e.g., the World Wide Web). A typical inverted index maps the words in the documents to locations of the words within the documents.

A document processing system, e.g., a web crawler and indexer, prepares the inverted index by processing the contents of the documents, pages, files, or sites retrieved from the document corpus using an automated process. The document processing system may also store the contents of the documents, or portions of the content, in a repository for use by a query processor when responding to a query.

SUMMARY

In some implementations of this specification, a process executes on a server having a low latency volatile random access memory and a low latency non-volatile memory. The process is associated with an index file stored in the low latency volatile random access memory and encrypted and non-encrypted data stored in the low latency non-volatile memory. The non-encrypted data will also be referred to as "plain" data. Data that results from a decryption of encrypted data will be referred to only as "decrypted" data and never as plain data. The process receives a query, finds data necessary to generate a response to the query using the index file, and retrieves the data from the low latency non-volatile memory whether the data is in an encrypted or a plain format. The process provides responses to queries where the responses are generated from a portion of either the encrypted data or the plain data stored in the low latency non-volatile memory.

In some implementations, the low latency non-volatile memory includes one or more flash memory devices. In certain implementations, the low latency volatile random access memory includes one or more dynamic random access memory devices. In some implementations, the data stored in the low latency volatile random access memory is used for temporary computations.

Other implementations include corresponding computer systems, methods, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

The subject matter described in this specification can be implemented in particular embodiments so as to realize one or more of the following advantages. The techniques described in this specification can allow a process to use larger index files that are associated with encrypted data because the encrypted data can be stored on larger low latency non-volatile memory. The system can control access to the encrypted data instead of only storing unencrypted copies of the encrypted data in a volatile random access memory, preventing unauthorized access to the encrypted data. The use of low latency volatile random access memory and low latency non-volatile memory can increase the performance of the system by allowing the system to respond to queries for data more quickly. Upon termination of the process, the data stored in the low latency volatile random access memory may become inaccessible to prevent access to decrypted data stored in the low latency volatile random access memory while the encrypted data stored on the low latency non-volatile memory remains encrypted.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
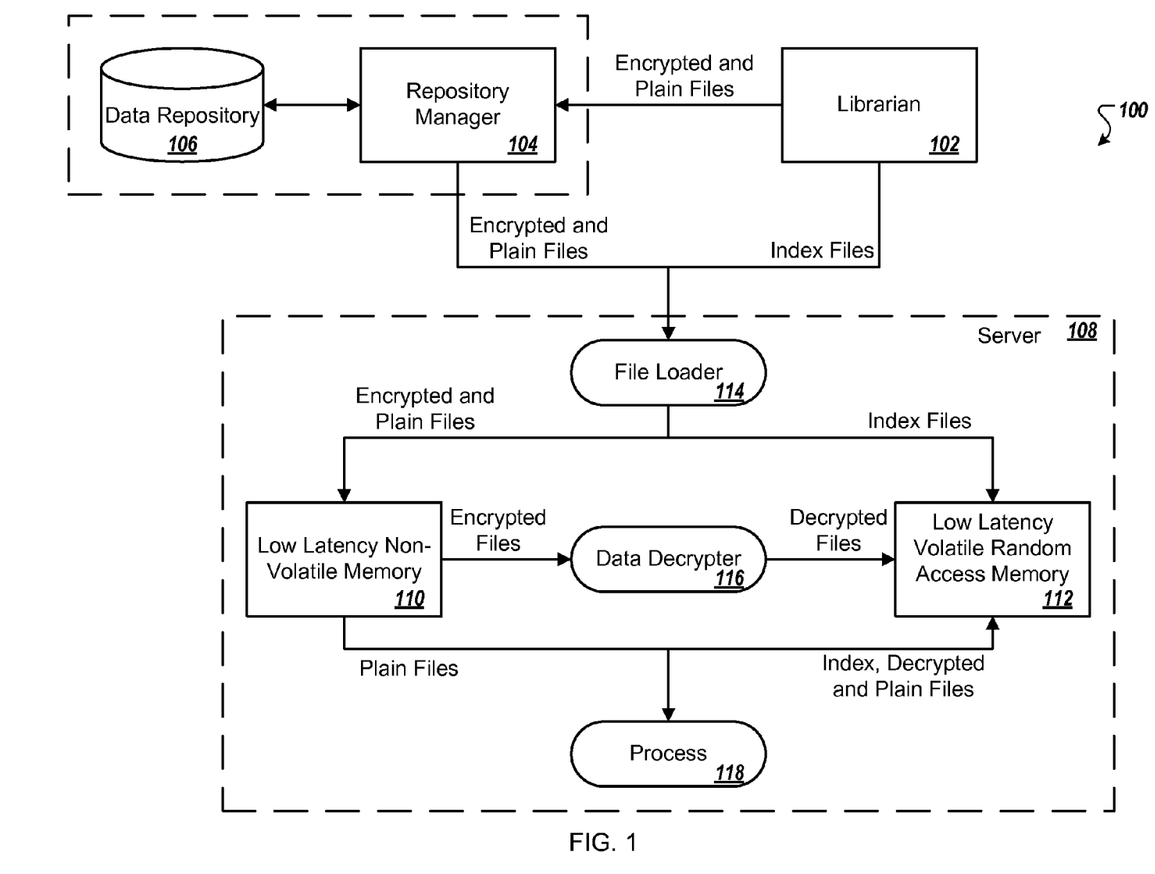
FIG. 1 is a block diagram of an environment for storing data in and serving data from a low latency non-volatile memory.

FIG. 1 is a block diagram of an environment 100 for storing data in and serving data from a low latency non-volatile memory. The low latency non-volatile memory stores both encrypted and unencrypted data while the environment 100 prevents unauthorized access to the encrypted data.

The environment 100 includes a librarian 102 which receives data, e.g., one or more files, creates an index file corresponding to the data, and provides the data to a repository manager 104. The repository manager 104 stores the data in a data repository 106 and tracks where the data is stored.

The data repository 106 includes one or more memory devices for storing data. The memory devices may include one or more hard disk drives and/or one or more flash drives, to name a few examples.

The data repository 106 stores both encrypted and plain data. When the repository manager 104 accesses the encrypted data stored in the data repository 106, the encrypted data is not decrypted. This may reduce overhead, by eliminating unnecessary decryption of data, and may increase the security of the data, by not decrypting the encrypted data until the encrypted data is needed.

In some implementations, the repository manager 104 and the data repository 106 are implemented on the same system of one or more computers. The computers are configured with and execute instructions to transfer the data between the repository manager 104 and the data repository 106, in addition to other actions performed by the repository manager 104 and the data repository 106. In other implementations, the repository manager 104 and the data repository 106 are included in separate systems, where each system includes one or more computers.

The index file created by the librarian 102 stores a mapping between information that may be responsive to a query and where the information is located in the data. For example, the index file can represent a table with one column of the table indicating types of information that can be responsive to a query where the different types of information can be indices or tokens in the index file. A second column in the table includes the locations where the information (e.g., the tokens) can be found, such as the addresses of one or more files that include the tokens. Some examples types of index files can include tries, inverted indexes, citation indexes, n-gram indexes, and document-term matrices.

In some implementations, each of the indices is associated with a posting list. A posting list indicates for each of a number of tokens the specific location of the token in the files associated with the specific index. For example, the posting list can identify specific index records included in a file that contain the token.

The librarian 102 stores the index file in a memory associated with the librarian 102. For example, a system that includes one or more computers executes the librarian 102 process on one or more processors and includes one or more memories used to store a plurality of index files. The one or more memories can include a plurality of hard disk drives, a plurality of flash drives, and/or multiple random access memories, among other types of memories.

When the librarian 102 receives an indication that data stored in the data repository 106 has been requested, the librarian 102 sends a notification to the repository manager 104 specifying one or more files that the repository manager 104 should retrieve from the data repository 106 and provide to a server 108. The librarian 102 also identifies the index file associated with the one or more files and provides the index file to the server 108.

The server 108 stores the one or more files on a low latency non-volatile memory 110 and the index file on a low latency volatile random access memory 112. For example, the low latency non-volatile memory 110 can include flash memory, ferroelectric random access memory, or both kinds of devices, among other examples.

The low latency volatile random access memory 112 can include one or more low latency dynamic random access memory devices, one or more low latency static random access memory devices, or both, among other examples.

The server 108 executes one or more software modules that process the data and/or the index file. For example, a file loader 114 receives the data from the repository manager 104 and the index file from the librarian 102 and stores the plain data and the index file in either the low latency non-volatile memory 110 or the low latency volatile random access memory 112, and the encrypted data in the low latency non-volatile memory 110.

A data decrypter 116 decrypts encrypted data to allow a process 118, executing on the server 108, to access the decrypted data and generate responses from the decrypted data. In some implementations, the decrypted data is stored first on the low latency volatile random access memory 112. Decrypted data is not stored on the low latency non-volatile memory 110.

The process 118, the data decrypter 116, and the data loaded by the file loader 114 into the low latency non-volatile memory 110 and into the low latency volatile random access memory 112 remain in place for an extended period of time, (e.g., minutes, hours, days, weeks, etc.) to provide query response services to other servers in the environment.

In some implementations, the data decrypter 116 is a software module included in the process 118. In other implementations, the decrypter 116 is instantiated as a separate process, as illustrated in FIG. 1.

In certain implementations, when the repository manager 104 stores a new file containing private data in the data repository 106, a random document key is generated for use during decryption of the new file and stored in encrypted form in the file header of the new file. When the server 108 accesses the new file, the data decrypter 116 retrieves the random document key and provides the random document key to a key store. The key store verifies that a client that sent the query associated with the new file has access to the new file and provides the data decrypter 116 with a decrypted key, generated from the random document key, so that the data decrypter 116 can use the decrypted key during decryption of all or a portion of the new file.

In some implementations, when the low latency non-volatile memory 110 is shared between multiple computers, a different computer or system from the server 108 includes the file loader 114. For example, a computer in communication with the server 108 can execute the instructions for the file loader 114 and store data from the repository manager 104 on the low latency non-volatile memory 110.

A computer network, e.g., a local area network (LAN), wide area network (WAN), the Internet, or a combination of them, provides data communication between the devices and systems in the environment 100. For example, the server 108 can communicate across the network with the computers that host the librarian 102, and/or the computers that host the repository manager 104.

Figure 2:
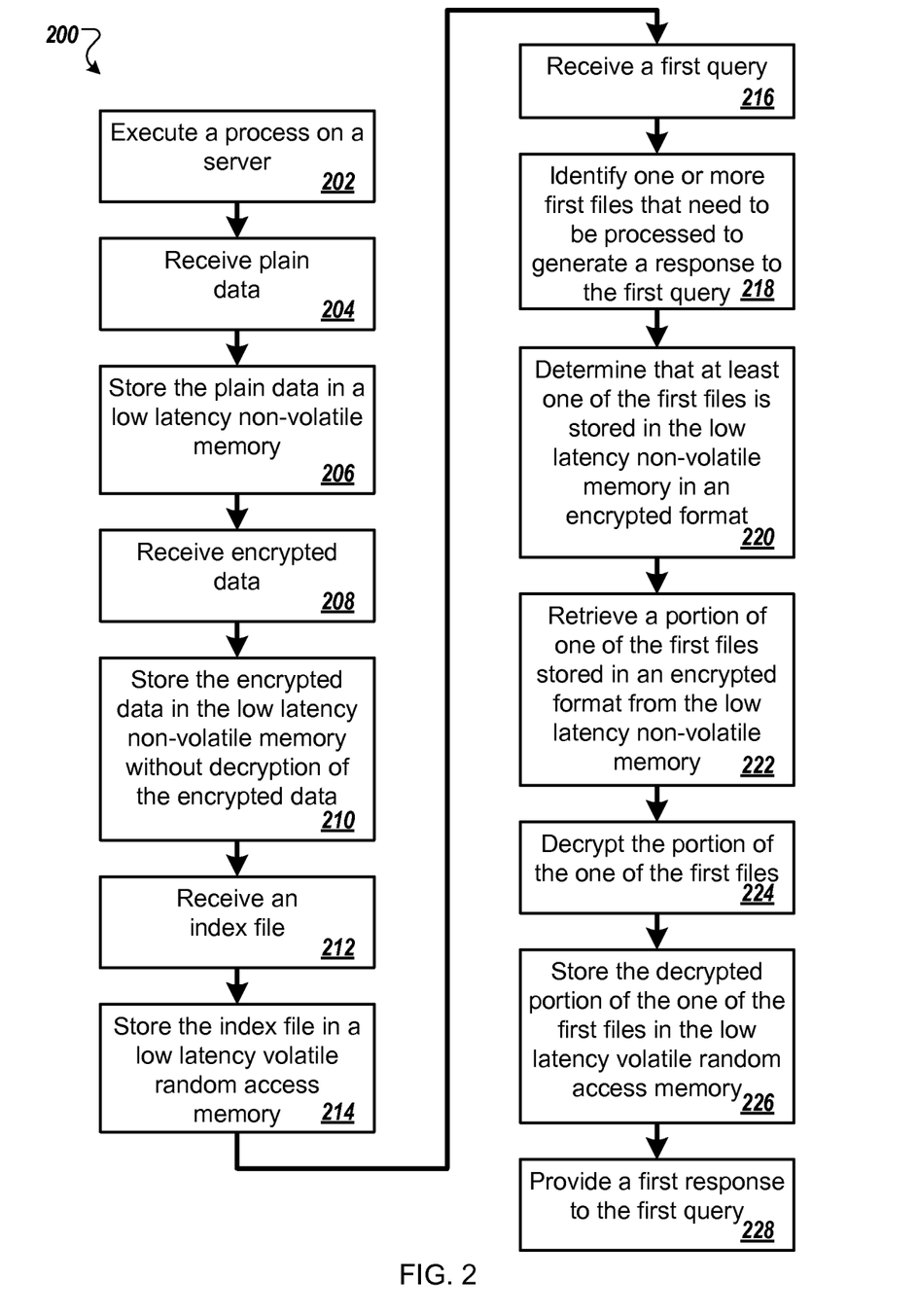
FIG. 2 is a flowchart of an example method to provide a first response to a first query.

FIG. 2 is a flowchart of an example method 200 to provide a first response to a first query. The method 200 will be described as being performed by a system made up of one or more appropriately programmed computers operating in one or more locations. For example, the system can include at least one of the computers from the environment 100.

The system executes (202) a process on a server. The server is a computer that includes a low latency non-volatile memory and a low latency volatile random access memory.

The server receives (204) plain data. The plain data includes at least one plain file and comprises public information that does not need to be encrypted. For example, the plain data may include one or more web pages, one or more public news articles, and/or one or more public advertisements, among other types of public information or public documents. The plain data is associated with the process.

In one example, a file loader receives the plain data from a repository manager. The server executes the file loader and the file loader manages the receipt and storage of files received by the computer according to whether the files are encrypted or plain.

In some implementations, each plain file includes one or more plain index records. For example, each of the plain index records is a portion of the plain file that may be accessed by the server.

The server stores (206) the plain data in one of the low latency memories of the server. The plain data can be stored in the low latency non-volatile memory or in the low latency volatile random access memory.

The server receives (208) encrypted data in the form of one or more encrypted files. For example, the encrypted data may include personal calendar appointments, contact information, one or more personal files, and/or one or more electronic mail messages, among other types of private information that is encrypted to prevent unauthorized access to the information.

In some implementations, each encrypted file includes one or more encrypted index records. Each of the encrypted index records is a portion of the encrypted file that may be accessed by the server and provided by the server in response to a query.

The server stores (210) the encrypted data in the low latency non-volatile memory without decryption of the encrypted data. In some implementations, the encrypted data is copied byte for byte from the repository manager to the flash memory.

The server receives (212) an index file. The index file includes indices that each include an address of a file associated with the index and stored in the low latency non-volatile memory and a flag indicating whether the file associated with the index is encrypted.

The index file includes one or more indices for both the plain files and the encrypted files. All of the files stored in the low latency non-volatile memory and associated with the process are associated with at least one index in the index file.

In some implementations, each of the indices is associated with an index record, where the index records are included in either the plain files or the encrypted files.

The server stores (214) the index file in a low latency volatile random access memory. For example, a file loader stores the index file in the low latency volatile random access memory of the server. The index file is in plain format and accessible to the process.

The server receives (216) a query. For example, the server may receive the query from a higher level server.

The server identifies (218) one or more files that need to be processed to generate a response to the query. For example, the process uses the index file to find one or more indices associated with data necessary to generate the response to the first query. Using the indices, the process identifies one or more files that contain data for the process to use when generating the response.

The server determines (220) that at least one of the files is stored in the low latency non-volatile memory in an encrypted format. For example, based on one of the indices identified by the process, the process identifies the flag associated with one of the indices and determines, based on the flag, that the corresponding file is encrypted.

The server retrieves (222) a portion of one of the files stored in an encrypted format from the low latency non-volatile memory. For example, a data decrypter uses the index to determine the address of the portion of the one of the files, or the index record, that will be used to generate a response to the query. In one example, the process retrieves the portion of the one of the files and provides the portion of the one of the files to the data decrypter.

The server decrypts (224) the portion of the one of the files. For example, the data decrypter decrypts the portion of the one of the files, or the index record, that is stored in an encrypted format.

The server stores (226) the decrypted portion of the one of the files in the low latency volatile random access memory. In the system, encrypted data exists in plain format only in the low latency volatile random access memory to reduce the possibility of unauthorized access to the encrypted or private data when the data is in a non-encrypted form, ensuring that only the process, executing on the server, has access to the decrypted data based on access control permissions associated with the low latency volatile random access memory.

In some implementations, the low latency volatile random access memory functions as a cache, where the data (i.e., the plain or decrypted data) associated with the process and in the low latency volatile random access memory is only accessible to the process on the server. As the process requires data from an encrypted file, that data is decrypted and the decrypted data is stored in the low latency volatile random access memory. When the decrypted data is no longer being used, the buffer in the low latency volatile random access memory used to store the decrypted data may be overwritten with different data, either decrypted or plain data, that is associated with the process.

The server provides (228) a response to the query. The server generates the response from the decrypted portion of the one of the files that is stored in the low latency volatile random access memory. The server may also use data from one or more additional files, either encrypted files or plain files, while generating the response. The server may provide the response to the computer that submitted the query.

Generally, in some implementations, the server will use the same universe of data to generate responses to many queries, sometimes using the same subsets and sometimes using different subsets of data (i.e., decrypted and/or plain data) for temporary computations when generating different responses. For this reason, the server may keep different subsets of data in the low latency volatile random access memory for different periods of time.

Figure 3:
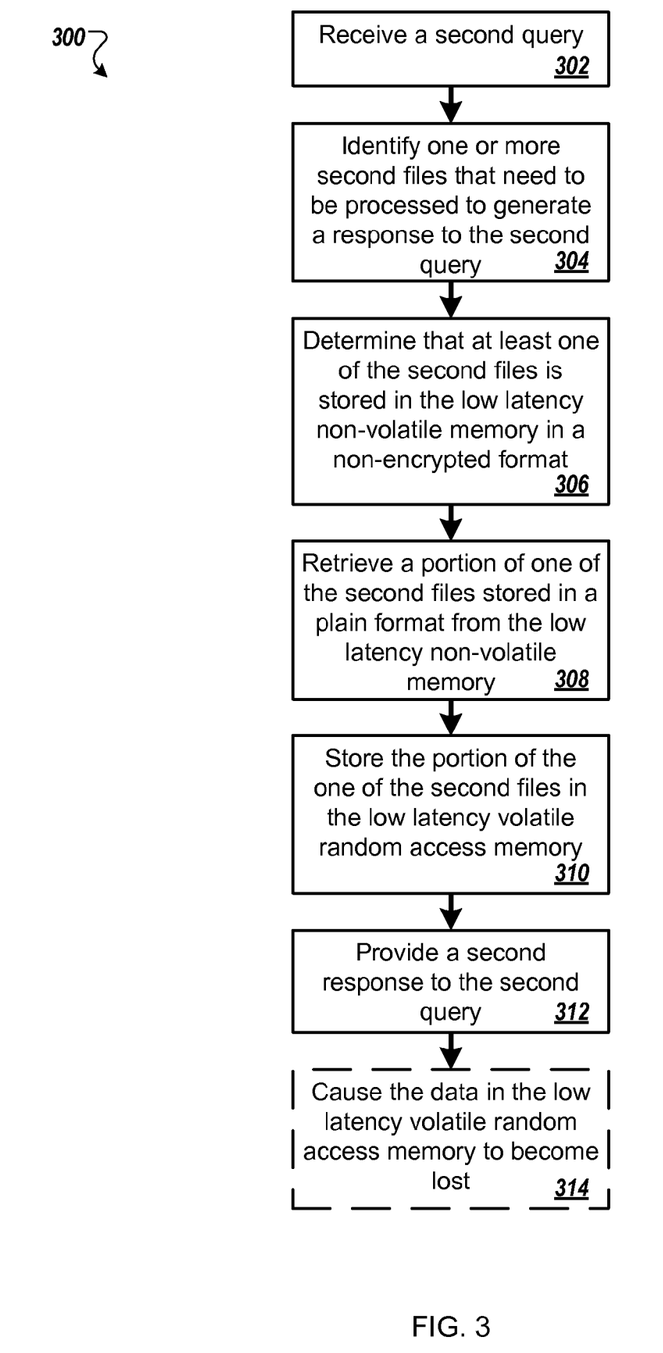
FIG. 3 is a flowchart of an example method to provide a second response to a second query.

FIG. 3 is a flowchart of an example method 300 to provide a second response to a second query. The method 300 will be described as being performed by a system made up of one or more appropriately programmed computers operating in one or more locations. For example, the system can include at least one of the computers from the environment 100. The method 300 can be performed after or in conjunction with the method 200.

A server receives (302) a second query. For example, the server executes a process that receives the second query and includes a low latency non-volatile memory and a low latency volatile random access memory.

The server identifies (304) one or more second files that need to be processed to generate a response to the second query. For example, the process identifies the one or more second files based on indices included in an index file stored in the low latency volatile random access memory, where the indices include the addresses of the second files in the low latency non-volatile memory.

The server determines (306) that at least one of the second files is stored in the low latency non-volatile memory in a plain format. For example, the process determines that a flag included in one of the indices associated with one of the second files indicates that the one of the second files is stored in a plain format on the low latency non-volatile memory.

The server retrieves (308) a portion of one of the second files stored in a plain format from the low latency non-volatile memory.

In some implementations, the index identifying the one of the second files is associated with an index record included in the one of the second files. In these implementations, the portion of the one of the second files that the server retrieves from the low latency non-volatile memory is the index record.

The server stores (310) the portion of the one of the second files in the low latency volatile random access memory.

The server provides (312) a second response to the second query, where the second response is generated from the portion of the one of the second files stored in the low latency volatile random access memory. For example, the process generates the second response from the portion of the one of the second files, and provides the second response to the computer that submitted the second query or a computer specified in the second query as the destination for the response. In some implementations, the process generates the second response from one or more portions where each of the portions is associated with one of the second files.

The server causes (314) the data in the low latency volatile random access memory to become lost upon termination of the process. For example, the contents of the low latency volatile random access memory will be lost after the process exits, guaranteeing that no access to plain data can be made by an external, unauthorized process.

In some implementations, the data in the low latency volatile random access memory becomes lost when the server resets the address space of the process. In certain implementations, the data in the low latency volatile random access memory becomes lost when the server erases the low latency volatile random access memory.

In some implementations, the method 300 can perform the steps associated with providing the second response without causing the data in the low latency volatile random access memory becomes lost.

In certain implementations, when the method 300 is performed in conjunction with the method 200, the server provides the second response without providing the first response.

In some implementations, when the method 300 is performed in conjunction with the method 200, the server provides the second response to the second query before providing the first response to the first query.

In some implementations, when a librarian determines that data provided to the system has been updated, the librarian provides the updated data and an updated index file associated with the updated data to the system. For example, the server receives encrypted and plain data from a repository manager and an index file, associated with the data, from a librarian. The server provides one or more responses to queries, where the responses are generated from the encrypted data and/or the plain data.

Continuing the example, when the librarian determines that some of the data provided to the system has been updated, the librarian provides the repository manager with instructions to send the all of the data, including the updated data, to the system. The file loader in the system receives the data, including the updated data, from the repository manager, and receives an updated index file from the librarian. The system ends the process that was associated with the non-updated data and executes a new process, where the new process is associated with the data most recently received from the repository manager and the librarian, including the updated data. The new process provides responses to additional queries, where the responses are generated from the data, potentially including the updated data.

In some implementations, when a system includes a larger dataset, multiple processes can be executed on separate servers and associated with different portions of the data. The system can provide queries to the respective servers where the queries that are provided to a specific server are determined based on the data stored in the specific server. In certain implementations, where the system receives a single query from a computer and provides the single query to multiple servers, the computer that submitted the query to the system may receive responses from each of the multiple servers that received the query.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   executing a process on a server, the server having a low latency non-volatile memory and a low latency volatile random access memory;
   receiving, for use by the process on the server, plain data including at least one plain file;
   storing the plain data in the low latency non-volatile memory;
   receiving, for use by the process on the server, encrypted data including at least one encrypted file;
   storing the encrypted data in the low latency non-volatile memory without decryption of the encrypted data;
   receiving, for use by the process, an index file, the index file including a plurality of indices, each index including an address of a file associated with the index and stored in the low latency non-volatile memory and a flag indicating whether the file associated with the index is encrypted, the indices including indices for both the at least one plain file and the at least one encrypted file;
   storing the index file in the low latency volatile random access memory;
   receiving, by the process, a first query;
   identifying from the index file one or more first files that need to be processed to generate a response to the first query;
   determining, by the process, that at least one of the first files is stored in the low latency non-volatile memory in an encrypted format;
   retrieving a portion of one of the first files stored in an encrypted format from the low latency non-volatile memory;
   decrypting, for use by the process, the portion of the one of the first files stored in an encrypted format;
   storing the decrypted portion of the one of the first files in the low latency volatile random access memory and not in the low latency non-volatile memory; and
   providing, by the process, a first response to the first query, the first response being generated from the decrypted portion of the one of the first files in the low latency volatile random access memory.

2. The method of claim 1, further comprising:
   generating two or more responses from the decrypted portion of the one of the first files in the low latency volatile random access memory, the first response being one of the two or more responses.

3. The method of claim 1, further comprising:
   receiving, by the process, a second query;
   identifying from the index file one or more second files that need to be processed to generate a response to the second query;
   determining, by the process, that at least one of the second files is stored in the low latency non-volatile memory in a plain format;
   retrieving a portion of one of the second files stored in a plain format from the low latency non-volatile memory;
   storing the portion of the one of the second files in the low latency volatile random access memory; and
   providing, by the process, a second response to the second query, the second response being generated from the portion of the one of the second files in the low latency volatile random access memory.

4. The method of claim 1, further comprising:
   causing the data in the low latency volatile random access memory to become lost upon termination of the process, the data comprising the index file and any plain data and decrypted data stored in the low latency volatile random access memory.

5. The method of claim 4, wherein the causing comprises resetting an address space of the process or erasing the data in the low latency volatile random access memory.

6. The method of claim 1, wherein the low latency non-volatile memory is a flash memory.

7. The method of claim 1, wherein retrieving the portion of the one of the first files from the low latency non-volatile memory comprises determining a physical address of the one of the first files based on the address in the index of the index associated with the one of the first files and a file header associated with the one of the first files.

8. The method of claim 1, wherein:
   each of the first files comprises one or more index records;
   the portion of the one of the first files retrieved from the low latency non-volatile memory is one of the index records;

the decrypting comprises decrypting the one of the index records; and the storing comprises storing the decrypted one of the index records in the low latency volatile random access memory.

9. The method of claim 1, wherein a file loader receives the plain data and the encrypted data and stores the plain data and the encrypted data in the low latency non-volatile memory.

10. A non-transitory computer storage medium encoded with instructions that, when executed by one or more computers, cause the one or more computers to perform operations comprising:

executing a process on a server, the server having a low latency non-volatile memory and a low latency volatile random access memory;

receiving, for use by the process on the server, plain data including at least one plain file;

storing the plain data in the low latency non-volatile memory;

receiving, for use by the process on the server, encrypted data including at least one encrypted file;

storing the encrypted data in the low latency non-volatile memory without decryption of the encrypted data;

receiving, for use by the process, an index file, the index file including a plurality of indices, each index including an address of a file associated with the index and stored in the low latency non-volatile memory and a flag indicating whether the file associated with the index is encrypted, the indices including indices for both the at least one plain file and the at least one encrypted file;

storing the index file in the low latency volatile random access memory;

receiving, by the process, a first query;

identifying from the index file one or more first files that need to be processed to generate a response to the first query;

determining, by the process, that at least one of the first files is stored in the low latency non-volatile memory in an encrypted format;

retrieving a portion of one of the first files stored in an encrypted format from the low latency non-volatile memory;

decrypting, for use by the process, the portion of the one of the first files stored in an encrypted format;

storing the decrypted portion of the one of the first files in the low latency volatile random access memory and not in the low latency non-volatile memory; and providing, by the process, a first response to the first query, the first response being generated from the decrypted portion of the one of the first files in the low latency volatile random access memory.

11. The medium of claim 10, further comprising:

generating two or more responses from the decrypted portion of the one of the first files in the low latency volatile random access memory, the first response being one of the two or more responses.

12. The medium of claim 10, wherein the operations further comprise:

receiving, by the process, a second query;

identifying from the index file one or more second files that need to be processed to generate a response to the second query;

determining, by the process, that at least one of the second files is stored in the low latency non-volatile memory in a plain format;

retrieving a portion of one of the second files stored in a plain format from the low latency non-volatile memory;

storing the portion of the one of the second files in the low latency volatile random access memory; and providing, by the process, a second response to the second query, the second response being generated from the portion of the one of the second files in the low latency volatile random access memory.

13. The medium of claim 10, wherein the operations further comprise:

causing the data in the low latency volatile random access memory to become lost upon termination of the process, the data comprising the index file and any plain data and decrypted data stored in the low latency volatile random access memory.

14. The medium of claim 13, wherein the causing comprises resetting an address space of the process or erasing the data in the low latency volatile random access memory.

15. The medium of claim 10, wherein retrieving the portion of the one of the first files from the low latency non-volatile memory comprises determining a physical address of the one of the first files based on the address in the index of the index associated with the one of the first files and a file header associated with the one of the first files.

16. The medium of claim 10, wherein:

each of the first files comprises one or more index records;

the portion of the one of the first files retrieved from the low latency non-volatile memory is one of the index records;

the decrypting comprises decrypting the one of the index records; and the storing comprises storing the decrypted one of the index records in the low latency volatile random access memory.

17. A system comprising:

one or more computers and one or more storage devices storing instructions that are operable, when executed by the one or more computers, to cause the one or more computers to perform operations comprising:

executing a process on a server, the server having a low latency non-volatile memory and a low latency volatile random access memory;

receiving, for use by the process on the server, plain data including at least one plain file;

storing the plain data in the low latency non-volatile memory;

receiving, for use by the process on the server, encrypted data including at least one encrypted file;

storing the encrypted data in the low latency non-volatile memory without decryption of the encrypted data;

receiving, for use by the process, an index file, the index file including a plurality of indices, each index including an address of a file associated with the index and stored in the low latency non-volatile memory and a flag indicating whether the file associated with the index is encrypted, the indices including indices for both the at least one plain file and the at least one encrypted file;

storing the index file in the low latency volatile random access memory;

receiving, by the process, a first query;

identifying from the index file one or more first files that need to be processed to generate a response to the first query;

determining, by the process, that at least one of the first files is stored in the low latency non-volatile memory in an encrypted format;

retrieving a portion of one of the first files stored in an encrypted format from the low latency non-volatile memory;

decrypting, for use by the process, the portion of the one of the first files stored in an encrypted format;

storing the decrypted portion of the one of the first files in the low latency volatile random access memory and not in the low latency non-volatile memory; and providing, by the process, a first response to the first query, the first response being generated from the decrypted portion of the one of the first files in the low latency volatile random access memory.

18. The system of claim 17, further comprising:

generating two or more responses from the decrypted portion of the one of the first files in the low latency volatile random access memory, the first response being one of the two or more responses.

19. The system of claim 17, wherein the operations further comprise:

receiving, by the process, a second query;

identifying from the index file one or more second files that need to be processed to generate a response to the second query;

determining, by the process, that at least one of the second files is stored in the low latency non-volatile memory in a plain format;

retrieving a portion of one of the second files stored in a plain format from the low latency non-volatile memory;

storing the portion of the one of the second files in the low latency volatile random access memory; and providing, by the process, a second response to the second query, the second response being generated from the portion of the one of the second files in the low latency volatile random access memory.

20. The system of claim 17, wherein the operations further comprise:

causing the data in the low latency volatile random access memory to become lost upon termination of the process, the data comprising the index file and any plain data and decrypted data stored in the low latency volatile random access memory.

21. The system of claim 20, wherein the causing comprises resetting an address space of the process or erasing the data in the low latency volatile random access memory.

22. The system of claim 17, wherein the low latency non-volatile memory is a flash memory.

23. The system of claim 17, wherein retrieving the portion of the one of the first files from the low latency non-volatile memory comprises determining a physical address of the one of the first files based on the address in the index of the index associated with the one of the first files and a file header associated with the one of the first files.

24. The system of claim 17, wherein:

each of the first files comprises one or more index records;

the portion of the one of the first files retrieved from the low latency non-volatile memory is one of the index records;

the decrypting comprises decrypting the one of the index records; and the storing comprises storing the decrypted one of the index records in the low latency volatile random access memory.

\* \* \* \* \*